(12) United States Patent
Netz

(10) Patent No.: US 6,374,234 B1
(45) Date of Patent: Apr. 16, 2002

(54) AGGREGATIONS PERFORMANCE ESTIMATION IN DATABASE SYSTEMS

(75) Inventor: Amir Netz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/337,751

(22) Filed: Jun. 22, 1999

(51) Int. Cl.[7] .............................................. G06F 17/30
(52) U.S. Cl. ...................... 707/2; 707/4; 707/5; 707/6; 707/102
(58) Field of Search ............................... 707/1, 2, 3, 4, 707/5, 6, 7, 100, 102, 103, 200

(56) References Cited

U.S. PATENT DOCUMENTS

| | | | | |
|---|---|---|---|---|
| 5,918,232 A | * | 6/1999 | Pouschine et al. | 707/103 |
| 5,926,820 A | * | 7/1999 | Agrawal et al. | 707/200 |
| 6,115,714 A | * | 9/2000 | Gallagher et al. | 707/100 |
| 6,205,447 B1 | * | 3/2001 | Malloy | 707/102 |
| 6,282,546 B1 | * | 8/2001 | Gleichauf et al. | 707/102 |

OTHER PUBLICATIONS

Chatziantoniou et al. (IEEE publication, Apr. 2001) discloses the MD-join: An operator for complex OLAP; pp. 524–533.*

Chen et al. (IEEE publication, Mar. 2000) discloses a data–warehouse/OLAP framework for scable telecommunication tandem traffic analysis, pp. 524–533.*

Flores, et al. (IEEE publication, Jul. 2000 discloses characterization of segmentation methods for multidimensional metrics, pp. 524–533.*

* cited by examiner

*Primary Examiner*—Diane D. Mizrahi
(74) *Attorney, Agent, or Firm*—Woodcock Washburn LLP

(57) ABSTRACT

A method, apparatus, and software are disclosed for efficient estimation of the performance gain associated with using a set of proposed aggregations, or summaries of data, in a database. This estimate is used in selecting which aggregations are materialized in an OLAP system or relational database. The estimate is based on the minimum and maximum costs of executing a given set of queries, as well as the cost of executing the given set of queries using the set of proposed aggregations. By expressing the estimate as a unitless constant with known upper and lower limits, the system conveys information as to the performance gain in a form that is readily understood by the user.

48 Claims, 5 Drawing Sheets

YEAR ☐ 1

QUARTER ▭ 4

MONTH ▭ 12

DETAILED DATA ▭⎬ ⎨▭ 1,000,000

FIG. 2

AGGREGATIONS PERFORMANCE ESTIMATION IN DATABASE SYSTEMS

RELATED APPLICATIONS

This application is related to copending application Ser. Nos. 09/338,390 and 09/338,212, both filed Jun. 22, 1999 and assigned to the instant assignee.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

TECHNICAL FIELD OF THE INVENTION

The present invention pertains generally to computer-implemented databases, and more particularly to summaries of data contained in such databases.

BACKGROUND OF THE INVENTION

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, a dimension is a structural attribute of a cube that is a list of members of a similar type in the user's perception of the data. For example, a time dimension can consist of days, weeks, months, and years, while a geography dimension can consist of cities, states/provinces, and countries. Dimensions act as indices for identifying values within a multi-dimensional array.

Databases are commonly queried for summaries of data rather than individual data items. For example, a user might want to know sales data for a given period of time without regard to geographical distinctions. These types of queries are efficiently answered through the use of data tools known as aggregations. Aggregations are precomputed summaries of selected data that allow an OLAP system or a relational database to respond quickly to queries by avoiding collecting and aggregating detailed data during query execution. Without aggregations, the system would need to use the detailed data to answer these queries, resulting in potentially substantial processing delays. With aggregations, the system computes and materializes aggregations ahead of time so that when the query is submitted to the system, the appropriate summary already exists and can be sent to the user much more quickly.

Calculating these aggregations, however, can be costly, both in terms of processing time and in terms of disk space consumed. Therefore, in many situations, efficiencies can be realized by materializing only selected aggregations rather than all possible aggregations. The aggregations that are materialized or computed should be selected based on the implications of using or not using each aggregation. These implications include, for example, the potential performance gain associated with using a set of selected aggregations.

Some conventional solutions measure potential performance gain by reading and aggregating the detailed data underlying the aggregations. This approach gives an accurate result, but can itself consume considerable computing resources, especially if the aggregations summarize a large amount of detailed data. Further, potential performance gain is often expressed in terms of time or computing resources saved. This information, however, is often of little use without additional information, such as baselines or information about the operating environment. Accordingly, a need continues to exist for a system that can estimate the potential performance gain of using a set of selected aggregations without reading and aggregating detailed data. This potential performance gain should be expressed in an intuitive manner to be of benefit to the user.

SUMMARY OF THE INVENTION

According to various example implementations of the invention, there is provided an efficient system for estimating the potential performance gain associated with using a set of selected aggregations without reading and aggregating the detailed data underlying the aggregations, as described herein below. In particular, the invention provides, among other things, for using aggregation sizes to measure the cost of materializing and maintaining the aggregations and, in turn, the potential benefit of using alternative aggregations.

In one particular implementation, the potential performance gain is estimated by determining a minimum cost TCm and a maximum cost TCf associated with executing the set of queries, as well as a cost TCa associated with executing the set of queries using the set of proposed aggregations. The potential performance gain is calculated as a function of the minimum cost TCm, the maximum cost TCf, and the cost TCa.

In another implementation, instead of determining TCa, the system instead determines a benefit of using each aggregation of the set of proposed aggregations to execute the set of queries and sums the determined benefits over all of the aggregations of the set of proposed aggregations. The potential gain is calculated as a ratio of the resulting sum to a difference between the maximum cost TCf and the minimum cost TCm.

Yet another implementation is directed to a method for estimating the potential performance gain by determining TCf as a product of a size of the detailed data and a number of queries in the set of queries. TCm is also determined. TCa is determined by, for each query of the set of queries, determining a best aggregation of the proposed set of aggregations for answering the query. The sizes of the determined best aggregations are summed along with, for each query for which no aggregation of the proposed set of aggregations is sufficiently detailed to answer, a size of the detailed data. The potential performance gain is the ratio of (TCf−TCa) to (TCf−TCm).

Still other implementations include computer-readable media and apparatuses for performing these methods. The above summary of the present invention is not intended to describe every implementation of the present invention. The figures and the detailed description that follow more particularly exemplify these implementations.

BRIEF DESCRIPTION OF THE DRAWINGS

FIG. 2 conceptually illustrates a size comparison of various aggregations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
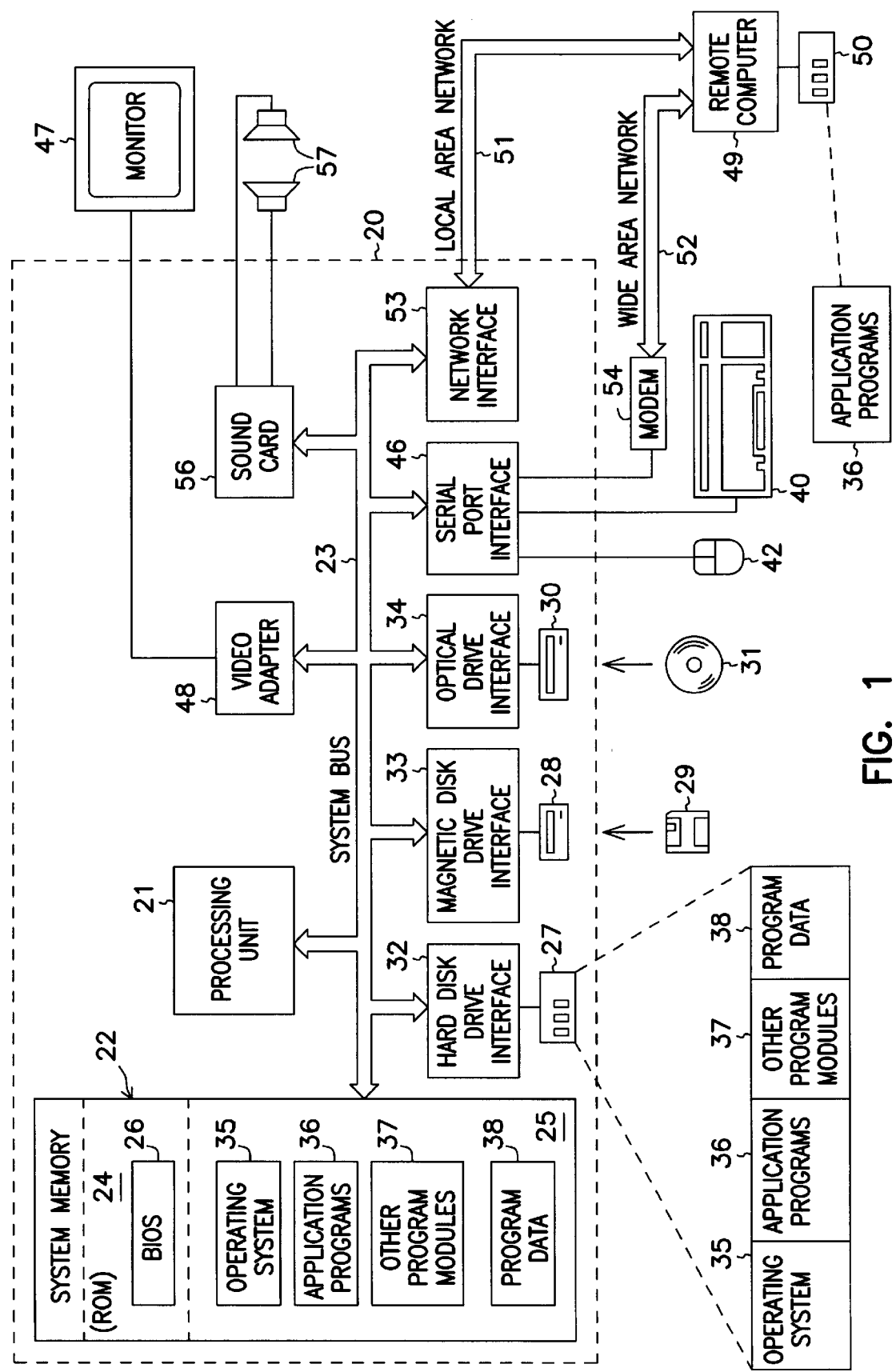
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 may be a conventional computer, a distributed computer, or any other type of computer; the invention is not so limited.

In other embodiments other configurations are used in PC 20. System bus 23 may be any of several types, including a memory bus or memory controller, a peripheral bus, and a local bus, and may use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks (not shown) onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a CD-ROM, DVD or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and may be moved among these devices, e.g., from hard disk drive 27 to RAM 25. Program modules include operating system 35, one or more application programs 36, other program modules 37, and/or program data 38. A user may enter commands and information into personal computer 20 through input devices such as a keyboard 40 and a pointing device 42. Other input devices (not shown) for various embodiments include one or more devices selected from a microphone, joystick, game pad, satellite dish, scanner, or the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as a printer or the like.

In some embodiments, personal computer 20 operates in a networked environment using logical connections to one or more remote computers such as remote computer 49. Remote computer 49 may be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote computer 49; typical embodiments would only include one or the other. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Example Embodiments of the Invention

As an illustrative operational example, a small, three-dimensional OLAP cube is considered. This cube has a time dimension with four hierarchy levels: year, quarter, month, and day. The second dimension, a products dimension, has six levels: all products, department, category, subcategory, brand, and stock keeping unit (SKU). Finally, a geography dimension also has six levels: whole world, region, country, state, city, and ZIP code. It will be appreciated that the OLAP cube can have more or fewer dimensions than in this example.

For an OLAP cube, the number of possible types of aggregations is given by the product of the number of hierarchy levels in each of the dimensions. Thus, considering the OLAP cube described above, a total of 144 (4×6×6) types of aggregations are possible. Optimal performance would be achieved by materializing all of the possible types of aggregations because all of the possible query results would be precomputed. Materializing and maintaining all of these aggregations, however, is costly in terms of both calculation time and disk space. The present invention provides for, among other things, an OLAP system that assists the user in selecting only some of these aggregations by estimating the size of an aggregation, which is directly related to the benefits and costs associated with materializing and maintaining the aggregation. Aggregation size is estimated without reading and aggregating the underlying detailed data, thereby conserving computing resources and yielding faster performance.

As discussed above, aggregations are used to improve the response time of an OLAP system or relational database to queries. Without aggregations, answering queries would involve reading and operating on detailed information on a query-by-query basis, which can consume considerable computing resources. Aggregations allow the system to avoid collecting and aggregating detailed data when a query is executed. Rather, the system computes and materializes aggregations ahead of time so that, by the time a query is issued to the system, the proper summary of the detailed data already exists and can be presented to the user quickly.

Aggregations can be used to answer even queries that do not match them exactly. For example, a query as to yearly sales of a certain product can be answered using aggregations of sales per year. It is evident, however, that aggregations of sales per month can also be used to answer the query simply by adding aggregated sales data for all of the months in the year of interest. While this operation is not as direct as using an aggregation that matches the query exactly, it is still much better than adding sales on, for example, a daily basis. Thus, the benefit of an aggregation is that it eliminates, at least in part, the need to retrieve and manipulate more detailed data to answer a query.

It can be observed that, the more detailed an aggregation is, the more queries it can answer. For example, monthly aggregations can be used to answer queries relating to both monthly and yearly sales. By contrast, yearly aggregations are not sufficiently detailed to answer queries relating to monthly sales. Yearly aggregations are, however, more efficient than monthly aggregations at answering yearly sales queries. As a general matter, the less detailed an aggregation is, the more efficiently it can answer those queries that it is sufficiently detailed to answer.

One measure of the benefit of an aggregation involves comparing the costs of answering the queries with and without the existence of the aggregation. Cost can be measured in a variety of ways. Some systems measure cost in terms of the estimated time required to answer the query. Other systems measure consumption of computing resources, and still others might measure cost in other ways. It is well known in the art that a direct relationship exists between the size of an aggregation and the cost involved in querying it. Therefore, the size difference between aggregations is used to measure the benefit of an aggregation, according to a particular embodiment of the present invention. Because the size of an aggregation is independent of external variables, such as processor speed, aggregation size is a particularly advantageous cost metric.

Using this metric, the benefit of an aggregation from a specific query is the number of rows of the database that will not be scanned due to the use of the aggregation. The benefit that can be derived by selecting a particular aggregation depends substantially on the other aggregations that have already been selected. For example, if the detailed sales data for a particular product family contains 1,000,000 rows, then selecting the product family-year-state aggregation, i.e., the aggregation of sales of product families per year per state, is greatly beneficial if no other aggregations exist. The benefit of selecting the product family-year-state aggregation can be expressed as the difference in sizes between the product family-year-state aggregation (one row) and the detailed data (1,000,000 rows), or 999,999. If, however, the product family-month-state aggregation has already been selected, the benefit of also selecting the product family-year-state aggregation is greatly diminished because this aggregation only avoids scanning twelve rows. In this case, the benefit of selecting the product family-year-state aggregation can be expressed as the difference in size between the product family-year-state aggregation (one row) and the product family-month-state aggregation (twelve rows), or 11. FIG. 2, which is not to scale, conceptually illustrates the difference in sizes between yearly, quarterly, and monthly aggregations and detailed data.

As a general matter, the benefit of an aggregation can be expressed as the difference between the (1) number of rows needed to answer the queries it can answer best and (2) the number of rows needed to answer those queries using the "second best" aggregation for each such query. If no "second best" aggregation exists, the number of detailed rows is substituted for the latter quantity. An aggregation can answer a query if it contains sufficiently detailed information for answering the query. For example, as discussed above, a monthly aggregation can answer a query for yearly sales data, but a yearly aggregation cannot answer a query for monthly sales data.

An aggregation is considered "best" to answer a query if it is the smallest aggregation that can answer a query. Similarly, a "second best" aggregation is the second smallest aggregation that can answer the query. For example, assume that product family-year-state (one row), product family-quarter-state (four rows), and product family-month-state (twelve rows) aggregations have all been materialized. Given these aggregations, the "best" and "second best" aggregations to answer a query for yearly sales data are the product family-year-state and product family-quarter-state aggregations. To answer a query for quarterly sales data, the "best" and "second best" aggregations are the product family-quarter-state and product family-month-state aggregations. It should be noted that the product family-year-state aggregation is not the "best" one because it does not contain sufficiently detailed information to answer the query.

Just as the benefit of an aggregation can be measured in a variety of ways, the cost of an aggregation can also be measured with a variety of metrics. Some systems calculate the cost in terms of the processing time required to materialize the aggregation, while others measure cost using different measures of computing resource consumption. As with measuring the benefit of an aggregation, however, cost is advantageously measured using the size of the aggregation as a metric, according to an embodiment of the present invention. This metric is particularly advantageous because the cost of storing the aggregation remains constant over time, while the processing effort involved in materializing the aggregation is transient and lasts only while the aggregation is being materialized.

The size of an aggregation can be determined in any of a variety of ways. One particular approach is disclosed in co-pending application Ser. No. 09/338,390, filed Jun. 22, 1999 and entitled "AGGREGATIONS SIZE ESTIMATION IN DATABASE SERVICES," which is assigned to the instant assignee. It should be noted, however, that any size estimation technique can be used consistent with the present invention. In a particular implementation, aggregation size is expressed in terms of rows rather than bytes because this measure ensures that performance gains and aggregation costs are expressed in similar terms.

According to one example embodiment of the present invention, the potential performance gain that would be realized by using a particular set of aggregations is estimated without reading the underlying source data from which the aggregations would be materialized. This estimate is expressed as a unitless quantity between zero and one. A value of zero indicates that no performance gain would result from materializing the proposed set of aggregations. A value of one, on the other hand, indicates that the proposed set of aggregations would produce the best possible performance for a particular set of queries. That is, a value of one indicates that there is no better set of aggregations for the set of queries under consideration.

Specifically, the potential performance gain is expressed as a quantity POG, or per cent optimization gain, which is calculated as the following ratio:

$$POG=(TCf-TCa)/(TCf-TCm)$$

where TCf is the total cost for calculating each query where all of the queries aggregate the fact table. TCf therefore represents the theoretical maximum cost of calculating the entire set Q of queries. TCa is the total cost of calculating the entire set Q of queries to be optimized where, for each query, the "best" aggregation a that is a member of the set A of proposed aggregations is used. TCm is the total cost of calculating the entire set Q of queries where, for each query, the smallest theoretical aggregation is used, regardless of whether it belongs to the set A of proposed aggregations. Thus, TCm represents the theoretical minimum cost of calculating the entire set Q of queries. The ratio POG is then a measure of the ratio between the performance gain realized by using the proposed set of aggregations A and the performance gain realized by using the theoretical best set of aggregations, i.e., the maximum performance gain that can be realized.

It can be readily observed that if all of the queries in the set A of proposed aggregations aggregate the fact table, TCa will equal TCf, and POG will be zero. This value means that no performance gain is realized by using the set A of proposed aggregations to calculate the queries in the set Q of queries. Conversely, if the set A of proposed aggregations consists of the smallest theoretical aggregation for each query, then TCa will equal TCm, and POG will be one. This value means that there is no better set of aggregations that will yield better performance than the set A of proposed aggregations for answering the queries in the set Q of queries. It should be noted that TCa can never be larger than TCm, and POG can therefore never be larger than one. Thus, POG is always between zero and one, inclusive.

Any of a variety of techniques can be used to calculate the quantities TCf, TCa, and TCm. The following discussion describes specific example techniques used by OLAP Services to calculate these quantities. It should be understood that these techniques are provided by way of illustration only and are not mandated. To the contrary, other techniques can be used consistent with the present invention.

In a specific embodiment of the present invention, the cost of executing a query is evaluated using the size of the aggregations used to execute the query, expressed in terms of the number of rows in each aggregation. To find the total cost of executing a set Q of queries q using a proposed set A of aggregations a, the system determines the cost of executing each query q and sums these costs over all of the queries q in the set Q of queries. To find the per cent optimization gain POG, the maximum and minimum costs TCf and TCm, respectively, of executing the queries are determined in this way, as is the cost of executing the queries using the proposed set A of aggregations.

Figure 3:
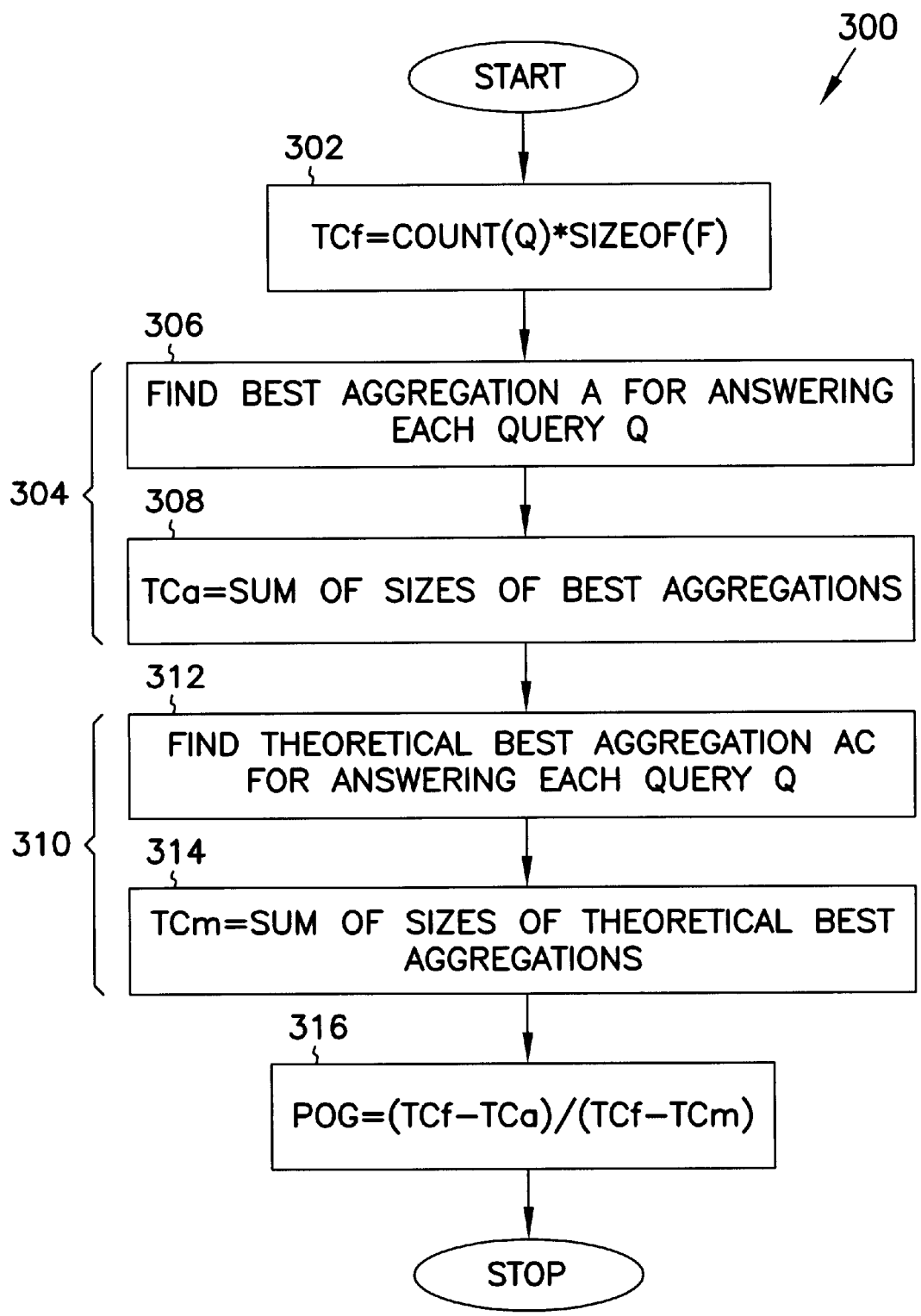
FIG. 3 depicts an example method for estimating the potential performance gain associated with using a set of selected aggregations, according to one embodiment of the present invention.

FIG. 3 is a flowchart depicting an example process 300 for determining the performance optimization gain POG that would result from using a proposed set A of aggregations a to execute a set Q of queries q. The maximum cost TCf of executing the queries is found by assuming that the entire fact table F must be scanned to evaluate each query q in the set Q of queries. Thus, the maximum cost TCf is determined as the product of the number of queries q and the size of the fact table F, as shown at a block 302 of FIG. 3. That is, $$TCf=\text{COUNT}(Q)\times\text{SIZEOF}(F)$$

The cost TCa of executing the queries using the proposed set A of aggregations is then found, as depicted at a group of blocks 304. For each query q, the "best" or smallest aggregation a that can answer the query q is found, as shown at a block 306. If no aggregation a exists in the set A of aggregations that can answer a particular query q, then the "best" aggregation for that query q is considered to include all of the fact rows of the fact table F. At a block 308, the sizes of these "best" aggregations are added together to find the total cost TCa of executing the queries q using the aggregations a. For each query q for which no aggregation a in the set A of aggregations is sufficiently detailed to answer, the size of the fact table F is added instead of the size of an aggregation. It should be noted that the maximum cost TCf can be determined using the process shown in the group of blocks 304, assuming that the set A contains no aggregations a.

The minimum cost TCm of executing the queries q of the set Q of queries is then found, as depicted at a group of blocks 310. A process similar to that described above in connection with the group of blocks 304 is used, this time assuming that the set A of aggregations contains the set of queries that are theoretically best, i.e., smallest, for answering the queries q. For each query q, the theoretical "best" aggregation ac that can answer the query q is found, as shown at a block 312. At a block 314, the sizes of these theoretical "best" aggregations are added together to find the total cost TCa of executing the queries q using the theoretical best aggregations ac.

Figure 4:
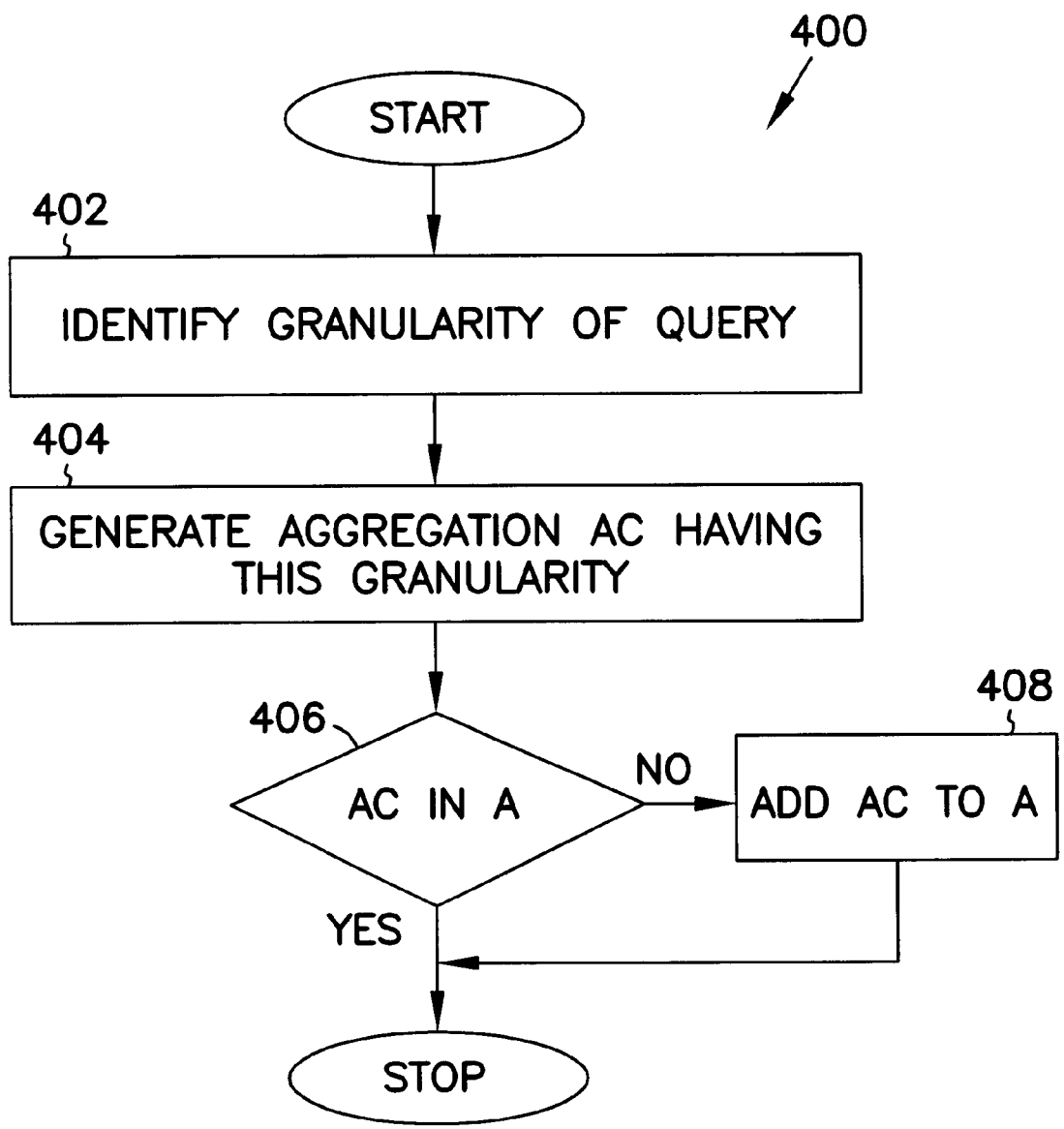
FIG. 4 is a flowchart illustrating an example process for finding the theoretical "best" aggregation for answering a particular query, according to another embodiment of the present invention.

FIG. 4 is a flowchart illustrating an example process 400 for finding the theoretical "best" aggregation ac for answering a particular query q. This process 400 is repeated for each query q in the set Q of queries. The granularity of each query q is identified, as shown at a block 402, by determining the aggregation levels of each dimension that are needed. For example, if the query q asks for sales data for all products in the United States for a particular month, its granularity is all products-country-month. Next, at a block 404, the aggregation definition ac that has this exact granularity is generated. This aggregation ac represents the "best" aggregation that can answer the query q. At a decision block 406, the system determines whether the aggregation ac is already included in the set A of aggregations. If not, it is added to the set A of aggregations, as depicted at a block 408.

It will be readily appreciated that the operations depicted at the block 302 and the groups of blocks 304 and 310 need not be performed in the sequence depicted in FIG. 3. To the contrary, the costs TCf, TCm, and TCa can be determined in any order. Within each group of blocks 304 and 310, of course, the operations illustrated in the individual blocks 306, 308, 312, and 314 should be performed in the order depicted in FIG. 3.

After these costs have been found, the per cent optimization gain POG is calculated as:

$$POG=(TCf-TCa)/(TCf-TCm)$$

as depicted at a block 316. Conceptually, the denominator TCf–TCm represents the difference in cost between the maximum cost and the minimum cost of executing the queries q in the set Q of queries. Likewise, the numerator TCf–TCa represents the difference in cost between the maximum cost of executing the queries and the cost of executing them using the proposed set A of aggregations a. Thus, the ratio POG gives a relative measure of the benefit of using the proposed set A of aggregations a to answer the queries q.

As discussed above, it is not necessary to use the particular methods described in connection with FIG. 3 to find the costs TCf, TCa, and TCm. For example, in some cases, the set A of aggregations is generated using an aggregation design method, an example of which is described more fully in U.S. Pending patent application Ser. No. 09/338,212 filed Jun. 22, 1999 and assigned to the instant assignee. This aggregation design method keeps track of the benefit provided by each individual aggregation of the set A of aggregations. In such cases, there are far fewer aggregations a than queries q. Rather than summing the cost of executing each query q in the set Q of queries, a more direct way of finding TCf–TCa, according to another embodiment of the present invention, is to sum the benefits provided by each aggregation. Substituting this calculation reduces processing time because the benefit measures have already been calculated in connection with generating the aggregations and need not be recalculated.

Determining the theoretical minimum cost TCm of executing a large number of queries q can consume considerable processing time and computing resources if the method described above in connection with the group of blocks 310 of FIG. 3 is used, due to the large number of aggregations a. If there is no prior knowledge of the usage patterns of the system, the number of aggregations a can be especially large because the system assumes one query for every possible aggregation. As a result, the theoretical set of aggregations contains all possible aggregations. For complex data cubes with many dimensions and levels, this theoretical set can be quite large.

In this particular case, TCm is the sum of the sizes of all of the possible aggregations. To calculate this sum precisely, the size of each possible aggregation must be calculated individually. Because the number of aggregations can be very large, this process can be very costly in terms of processing time and computing resources.

As an alternative, when a fanning out algorithm is used to generate the set of aggregations, an interpolation technique is optionally used to estimate the total size of all of the possible aggregations without actually calculating the size of each aggregation. A fanning out algorithm is one that incrementally builds the set of aggregation starting from the smallest aggregations and fanning out to the larger ones. For a specific example of a fanning out algorithm, reference is made to U.S. Pending patent Application Ser. No. 09/338, 390, filed Jun. 22, 2001 and assigned to the instant assignee.

Figure 5:
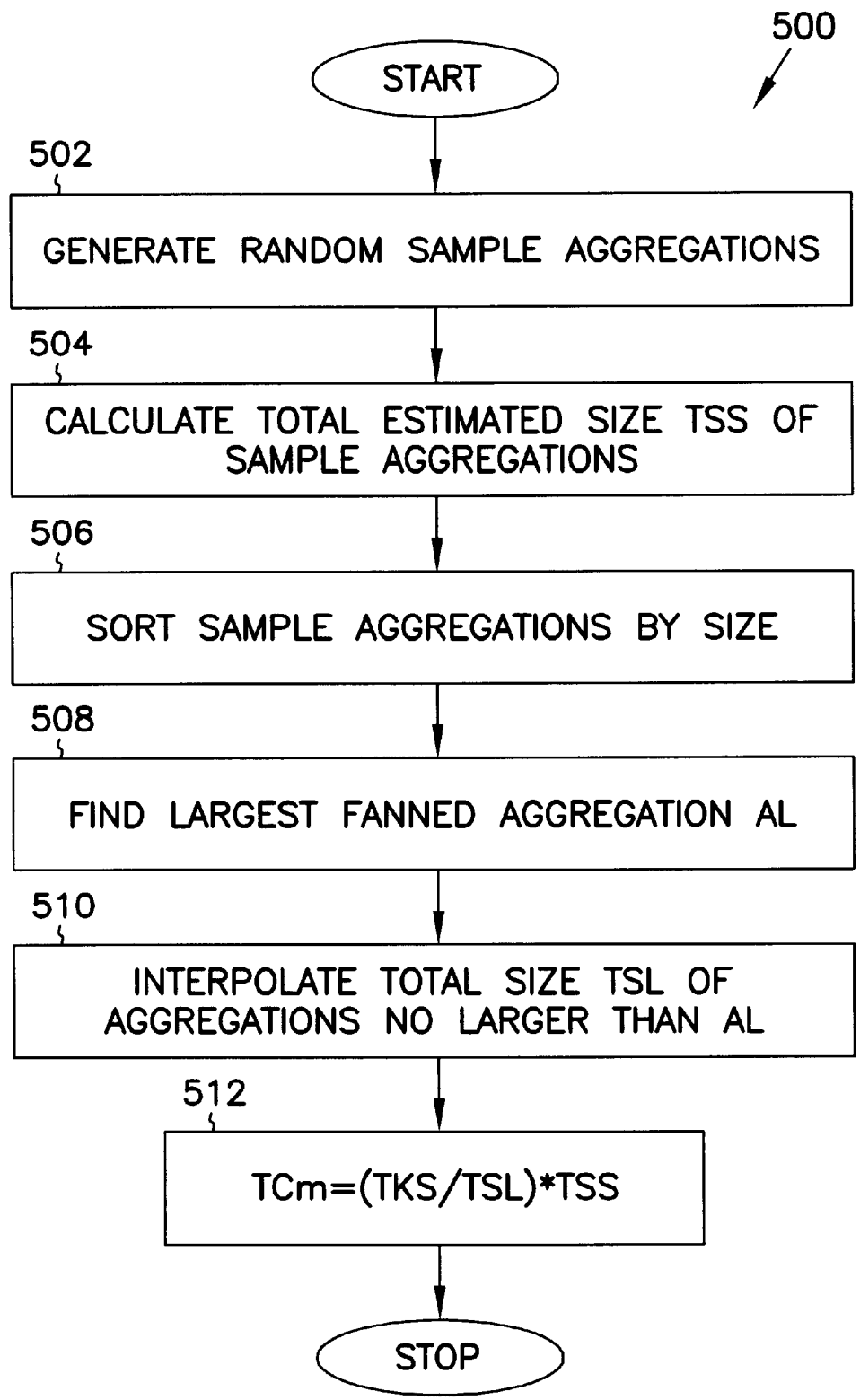
FIG. 5 is a flowchart depicting an example interpolation technique for estimating the total size of a set of many aggregations, according to still another embodiment of the present invention.

FIG. 5 is a flowchart depicting an example interpolation technique 500 for estimating the total size of a set of many aggregations and, therefore, the total cost of executing a large number of queries, when a fanning out algorithm is used to generate the aggregations. This technique 500 assumes that aggregation size increases in a predictable manner as aggregations aggregate at more detailed levels. First, at a block 502, the system generates a random sample set As of possible aggregations from the known aggregation space. Next, at a block 504, the total estimated size TSS of these aggregations is calculated. The aggregations in the sample set As of aggregations are then sorted in order of size, as depicted at a block 506. It is assumed that the fanning out algorithm will maintain the total size TKS of the "fanned" aggregations.

Next, for a given set A of aggregations to be evaluated, the largest "fanned" aggregation al is found, as depicted at a block 508. The system then interpolates the total size TSL of the aggregations in the sample set As that are smaller or equal in size to the largest "fanned" aggregation al, as shown at a block 510. Finally, at a block 512, the theoretical minimum cost TCm of executing the queries q is found as $$TCm=(TKS/TSL) \times TSS$$

or the total estimated size of the sample aggregations (TSS) multiplied by a scale factor. This scale factor is the ratio of the total size of the "fanned" aggregations (TKS) to the total size of the aggregations in the sample set As that are no larger than the largest "fanned" aggregation al (TSL). Accordingly, this scale factor reflects the assumption that the aggregation size increases in a predictable manner as aggregations aggregate at more detailed levels.

In conclusion, the present invention provides a technique for estimating the potential performance gain associated with using a set of selected aggregations. Because the potential performance gain is expressed as a unitless quantity between zero and one, this measure is useful even without knowledge of the operating environment or other external considerations. Further, because the quantity is limited to the range between zero and one, the user can learn not only how much performance gain would be realized, but also how much additional performance gain could be realized by using an alternative set of aggregations. This performance information, in turn, is useful for deciding which aggregations of a potentially large number of possible aggregations should be selected for materialization. By materializing and maintaining only selected aggregations, computing resources are conserved. The present invention further conserves computing resources by avoiding scanning and processing detailed data.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof.

What is claimed is:

1. A method for estimating a potential performance gain of using a set of proposed aggregations that aggregate detailed data in a database to execute a set of queries, the method comprising:

determining a minimum cost TCm and a maximum cost TCf associated with executing the set of queries;

determining a cost TCa associated with executing the set of queries using the set of proposed aggregations; and calculating the potential performance gain as a function of the minimum cost TCm, the maximum cost TCf, and the cost TCa.

2. The method, according to claim 1, wherein the potential performance gain is calculated as a ratio of (TCf−TCa) to (TCf−TCm).

3. The method, according to claim 1, wherein at least one of the minimum cost TCm, the maximum cost TCf, and the cost TCa are determined as a function of aggregation size.

4. The method, according to claim 3, wherein aggregation size is expressed in terms of number of rows.

5. The method, according to claim 1, wherein the maximum cost TCf is determined as a product of a size of the detailed data and a number of queries in the set of queries.

6. The method, according to claim 1, wherein the cost TCa is determined by:

for each query of the set of queries, determining a best aggregation of the proposed set of aggregations for answering the query; and summing sizes of the determined best aggregations and, for each query for which no aggregation of the proposed set of aggregations is sufficiently detailed to answer, a size of the detailed data.

7. The method, according to claim 1, wherein the minimum cost TCm is determined by:

for each query of the set of queries, determining a best theoretical aggregation for answering the query; and summing sizes of the determined best theoretical aggregations.

8. The method, according to claim 7, wherein determining the best theoretical aggregation for answering a query comprises:

identifying a granularity of the query; and generating, as the best theoretical aggregation, an aggregation having the identified granularity.

9. The method, according to claim 1, wherein the minimum cost TCm is determined by:

generating a random set As of sample aggregations from a known aggregation space;

determining a total estimated size TSS of the sample aggregations;

sorting the sample aggregations in order of size;

determining a largest fanned aggregation al;

interpolating a total size TSL of aggregations in the random set As that are no larger than the largest fanned aggregation al; and calculating the minimum cost TCm as a product of the total estimated size TSS of the sample aggregations and a ratio TKS/TSL of a total size TKS of the fanned aggregations to the total size TSL of the aggregations in the random set As that are no larger than the largest fanned aggregation al.

10. A method for estimating a potential performance gain of using a set of proposed aggregations that aggregate detailed data in a database to execute a set of queries, the method comprising:

determining a minimum cost TCm and a maximum cost TCf associated with executing the set of queries;

determining a benefit of using each aggregation of the set of proposed aggregations to execute the set of queries;

summing the determined benefits over all of the aggregations of the set of proposed aggregations; and calculating the potential performance gain as a ratio of the sum of the determined benefits to a difference between the maximum cost TCf and the minimum cost TCm.

11. The method, according to claim 10, wherein the maximum cost TCf is determined as a product of a size of the detailed data and a number of queries in the set of queries.

12. The method, according to claim 10, wherein the cost TCa is determined by:

for each query of the set of queries, determining a best aggregation of the proposed set of aggregations for answering the query; and summing sizes of the determined best aggregations and, for each query for which no aggregation of the proposed set of aggregations is sufficiently detailed to answer, a size of the detailed data.

13. The method, according to claim 10, wherein the minimum cost TCm is determined by:

for each query of the set of queries, determining a best theoretical aggregation for answering the query; and summing sizes of the determined best theoretical aggregations.

14. The method, according to claim 13, wherein determining the best theoretical aggregation for answering a query comprises:

identifying a granularity of the query; and generating, as the best theoretical aggregation, an aggregation having the identified granularity.

15. The method, according to claim 10, wherein the minimum cost TCm is determined by:

generating a random set As of sample aggregations from a known aggregation space;

determining a total estimated size TSS of the sample aggregations;

sorting the sample aggregations in order of size;

determining a largest fanned aggregation al;

interpolating a total size TSL of aggregations in the random set As that are no larger than the largest fanned aggregation al; and calculating the minimum cost TCm as a product of the total estimated size TSS of the sample aggregations and a ratio TKS/TSL of a total size TKS of the fanned aggregations to the total size TSL of the aggregations in the random set As that are no larger than the largest fanned aggregation al.

16. A method for estimating a potential performance gain of using a set of proposed aggregations that aggregate detailed data in a database to execute a set of queries, the method comprising:

determining a maximum cost TCf associated with executing the set of queries as a product of a size of the detailed data and a number of queries in the set of queries;

determining a minimum cost TCm associated with executing the set of queries;

determining a cost TCa associated with executing the set of queries using the set of proposed aggregations by, for each query of the set of queries, determining a best aggregation of the proposed set of aggregations for answering the query, and summing sizes of the determined best aggregations and, for each query for which no aggregation of the proposed set of aggregations is sufficiently detailed to answer, a size of the detailed data; and calculating the potential performance gain as a ratio of (TCf–TCa) to (TCf–TCm).

17. A computer-readable medium for use in estimating a potential performance gain of using a set of proposed aggregations that aggregate detailed data in a database, the computer-readable medium having computer-executable instructions for:

determining a minimum cost TCm and a maximum cost TCf associated with executing the set of queries;

determining a cost TCa associated with executing the set of queries using the set of proposed aggregations; and calculating the potential performance gain as a function of the minimum cost TCm, the maximum cost TCf, and the cost TCa.

18. The computer-readable medium, according to claim 17, having further computer-executable instructions for calculating the potential performance gain as a ratio of (TCf–TCa) to (TCf–TCm).

19. The computer-readable medium, according to claim 17, having further computer-executable instructions for determining at least one of the minimum cost TCm, the maximum cost TCf, and the cost TCa as a function of aggregation size.

20. The computer-readable medium, according to claim 19, wherein aggregation size is expressed in terms of number of rows.

21. The computer-readable medium, according to claim 17, having further computer-executable instructions for determining the maximum cost TCf as a product of a size of the detailed data and a number of queries in the set of queries.

22. The computer-readable medium, according to claim 17, having further computer-executable instructions for determining the cost TCa by:

for each query of the set of queries, determining a best aggregation of the proposed set of aggregations for answering the query; and summing sizes of the determined best aggregations and, for each query for which no aggregation of the proposed set of aggregations is sufficiently detailed to answer, a size of the detailed data.

23. The computer-readable medium, according to claim 17, having further computer-executable instructions for determining the minimum cost TCm by:

for each query of the set of queries, determining a best theoretical aggregation for answering the query; and summing sizes of the determined best theoretical aggregations.

24. The computer-readable medium, according to claim 23, having further computer-executable instructions for determining the best theoretical aggregation for answering a query by:

identifying a granularity of the query; and generating, as the best theoretical aggregation, an aggregation having the identified granularity.

25. The computer-readable medium, according to claim 17, having further computer-executable instructions for determining the minimum cost TCm by:

generating a random set As of sample aggregations from a known aggregation space;

determining a total estimated size TSS of the sample aggregations;

sorting the sample aggregations in order of size;

determining a largest fanned aggregation al;

interpolating a total size TSL of aggregations in the random set As that are no larger than the largest fanned aggregation al; and calculating the minimum cost TCm as a product of the total estimated size TSS of the sample aggregations and a ratio TKS/TSL of a total size TKS of the fanned aggregations to the total size TSL of the aggregations in the random set As that are no larger than the largest fanned aggregation al.

26. A computer-readable medium for use in estimating a potential performance gain of using a set of proposed aggregations that aggregate detailed data in a database, the computer-readable medium having computer-executable instructions for:

determining a minimum cost TCm and a maximum cost TCf associated with executing the set of queries;

determining a benefit of using each aggregation of the set of proposed aggregations to execute the set of queries;

summing the determined benefits over all of the aggregations of the set of proposed aggregations; and calculating the potential performance gain as a ratio of the sum of the determined benefits to a difference between the maximum cost TCf and the minimum cost TCm.

27. The computer-readable medium, according to claim 26, having further computer-executable instructions for determining the maximum cost TCf as a product of a size of the detailed data and a number of queries in the set of queries.

28. The computer-readable medium, according to claim 26, having further computer-executable instructions for determining the cost TCa by:

for each query of the set of queries, determining a best aggregation of the proposed set of aggregations for answering the query; and summing sizes of the determined best aggregations and, for each query for which no aggregation of the proposed set of aggregations is sufficiently detailed to answer, a size of the detailed data.

29. The computer-readable medium, according to claim 26, having further computer-executable instructions for determining the minimum cost TCm by:

for each query of the set of queries, determining a best theoretical aggregation for answering the query; and summing sizes of the determined best theoretical aggregations.

30. The computer-readable medium, according to claim 29, having further computer-executable instructions for determining the best theoretical aggregation for answering a query by:

identifying a granularity of the query; and generating, as the best theoretical aggregation, an aggregation having the identified granularity.

31. The computer-readable medium, according to claim 26, having further computer-executable instructions for determining the minimum cost TCm by:

generating a random set As of sample aggregations from a known aggregation space;

determining a total estimated size TSS of the sample aggregations;

sorting the sample aggregations in order of size;

determining a largest fanned aggregation al;

interpolating a total size TSL of aggregations in the random set As that are no larger than the largest fanned aggregation al; and calculating the minimum cost TCm as a product of the total estimated size TSS of the sample aggregations and a ratio TKS/TSL of a total size TKS of the fanned aggregations to the total size TSL of the aggregations in the random set As that are no larger than the largest fanned aggregation al.

32. A computer-readable medium for use in estimating a potential performance gain of using a set of proposed aggregations that aggregate detailed data in a database, the computer-readable medium having computer-executable instructions for:

determining a maximum cost TCf associated with executing the set of queries as a product of a size of the detailed data and a number of queries in the set of queries;

determining a minimum cost TCm associated with executing the set of queries;

determining a cost TCa associated with executing the set of queries using the set of proposed aggregations by, for each query of the set of queries, determining a best aggregation of the proposed set of aggregations for answering the query, and summing sizes of the determined best aggregations and, for each query for which no aggregation of the proposed set of aggregations is sufficiently detailed to answer, a size of the detailed data; and calculating the potential performance gain as a ratio of (TCf−TCa) to (TCf−TCm).

33. For use in estimating a potential performance gain of using a set of proposed aggregations that aggregate detailed data in a database, a computer arrangement configured to:

determine a minimum cost TCm and a maximum cost TCf associated with executing the set of queries;

determine a cost TCa associated with executing the set of queries using the set of proposed aggregations; and calculate the potential performance gain as a function of the minimum cost TCm, the maximum cost TCf, and the cost TCa.

34. The computer arrangement, according to claim 33, further configured to calculate the potential performance gain as a ratio of (TCf−TCa) to (TCf−TCm).

35. The computer arrangement, according to claim 33, further configured to determine at least one of the minimum cost TCm, the maximum cost TCf, and the cost TCa as a function of aggregation size.

36. The computer arrangement, according to claim 35, wherein aggregation size is expressed in terms of number of rows.

37. The computer arrangement, according to claim 33, further configured to determine the maximum cost TCf as a product of a size of the detailed data and a number of queries in the set of queries.

38. The computer arrangement, according to claim 33, further configured to determine the cost TCa by:

for each query of the set of queries, determining a best aggregation of the proposed set of aggregations for answering the query; and summing sizes of the determined best aggregations and, for each query for which no aggregation of the proposed set of aggregations is sufficiently detailed to answer, a size of the detailed data.

39. The computer arrangement, according to claim 33, further configured to determine the minimum cost TCm by:

for each query of the set of queries, determining a best theoretical aggregation for answering the query; and summing sizes of the determined best theoretical aggregations.

40. The computer arrangement, according to claim 39, further configured to determine the best theoretical aggregation for answering a query by:

identifying a granularity of the query; and generating, as the best theoretical aggregation, an aggregation having the identified granularity.

41. The computer arrangement, according to claim 33, further configured to determine the minimum cost TCm by:

generating a random set As of sample aggregations from a known aggregation space;

determining a total estimated size TSS of the sample aggregations;

sorting the sample aggregations in order of size;

determining a largest fanned aggregation al;

interpolating a total size TSL of aggregations in the random set As that are no larger than the largest fanned aggregation al; and calculating the minimum cost TCm as a product of the total estimated size TSS of the sample aggregations and a ratio TKS/TSL of a total size TKS of the fanned aggregations to the total size TSL of the aggregations in the random set As that are no larger than the largest fanned aggregation al.

42. For use in estimating a potential performance gain of using a set of proposed aggregations that aggregate detailed data in a database, a computer arrangement configured to:

determine a minimum cost TCm and a maximum cost TCf associated with executing the set of queries;

determine a benefit of using each aggregation of the set of proposed aggregations to execute the set of queries;

sum the determined benefits over all of the aggregations of the set of proposed aggregations; and calculate the potential performance gain as a ratio of the sum of the determined benefits to a difference between the maximum cost TCf and the minimum cost TCm.

43. The computer arrangement, according to claim 42, further configured to determine the maximum cost TCf as a product of a size of the detailed data and a number of queries in the set of queries.

44. The computer arrangement, according to claim 42, further configured to determine the cost TCa by:

for each query of the set of queries, determining a best aggregation of the proposed set of aggregations for answering the query; and summing sizes of the determined best aggregations and, for each query for which no aggregation of the proposed set of aggregations is sufficiently detailed to answer, a size of the detailed data.

45. The computer arrangement, according to claim 42, further configured to determine the minimum cost TCm by:

for each query of the set of queries, determining a best theoretical aggregation for answering the query; and summing sizes of the determined best theoretical aggregations.

46. The computer arrangement, according to claim 45, further configured to determine the best theoretical aggregation for answering a query by:

identifying a granularity of the query; and generating, as the best theoretical aggregation, an aggregation having the identified granularity.

47. The computer arrangement, according to claim 42, further configured to determine the minimum cost TCm by:

generating a random set As of sample aggregations from a known aggregation space;

determining a total estimated size TSS of the sample aggregations;

sorting the sample aggregations in order of size;

determining a largest fanned aggregation al;

interpolating a total size TSL of aggregations in the random set As that are no larger than the largest fanned aggregation al; and calculating the minimum cost TCm as a product of the total estimated size TSS of the sample aggregations and a ratio TKS/TSL of a total size TKS of the fanned aggregations to the total size TSL of the aggregations in the random set As that are no larger than the largest fanned aggregation al.

48. For use in estimating a potential performance gain of using a set of proposed aggregations that aggregate detailed data in a database, a computer arrangement configured to:

determine a maximum cost TCf associated with executing the set of queries as a product of a size of the detailed data and a number of queries in the set of queries;

determine a minimum cost TCm associated with executing the set of queries;

determine a cost TCa associated with executing the set of queries using the set of proposed aggregations by, for each query of the set of queries, determining a best aggregation of the proposed set of aggregations for answering the query, and summing sizes of the determined best aggregations and, for each query for which no aggregation of the proposed set of aggregations is sufficiently detailed to answer, a size of the detailed data; and calculate the potential performance gain as a ratio of (TCf−TCa) to (TCf−TCm).

* * * * *

UNITED STATES PATENT AND TRADEMARK OFFICE
CERTIFICATE OF CORRECTION

PATENT NO.      : 6,374,234 B1
DATED           : April 16, 2002
INVENTOR(S)     : Amir Netz It is certified that error appears in the above-identified patent and that said Letters Patent is hereby corrected as shown below:

<u>Title page,</u>
OTHER PUBLICATIONS, insert -- ) -- after "2000" in the "Flores, et al. " publication listed in the second column of Other Publications.

Signed and Sealed this

Tenth Day of December, 2002

JAMES E. ROGAN
*Director of the United States Patent and Trademark Office*